Patented July 11, 1939

2,165,850

UNITED STATES PATENT OFFICE 2,165,850

CELLULOSE ACETATE AND METHOD OF PRODUCING SAME

Wolfgang Gruber, Matthias Thoma, and Hugo Zoebelein, Burghausen, Germany, assignors to Dr. Alexander Wacker Gesellschaft für elektrochemische Industrie, G. m. b. H., Munich, Germany No Drawing. Application October 15, 1937, Serial No. 169,228. In Germany October 27, 1936

14 Claims. (Cl. 260—230)

The present invention relates to a highly concentrated solution of a partly saponified, highly viscous, stable cellulose acetate and to a method for producing same.

It is an object of the present invention to provide a highly concentrated solution of a partly saponified, highly viscous cellulose acetate which is extraordinarily stable particularly when heated and which has excellent spinning qualities, and to provide a method for producing said cellulose acetate.

It is a further object of the present invention to provide a highly concentrated solution of a partly saponified, highly viscous cellulose acetate which is extremely stable and heat resisting and does not need to be stabilized by boiling in water or diluted acid.

It is a further object of the present invention to provide a highly concentrated solution of a partly saponified, highly viscous cellulose acetate and a method for producing same at normal or approximately normal atmospheric temperatures and without excessive use of diluting agents such as glacial acetic acid or other expensive organic solvents.

It is a further object of the present invention to provide a highly concentrated solution of a partly saponified, highly viscous cellulose acetate which does not gelatinize during progressive esterification.

Further and other objects and advantages of the present invention will be apparent from the accompanying specification and claims and the examples for carrying out our new process.

According to the present invention acetylation of the cellulose is carried out progressively in three different stages followed by saponification under special conditions. At first acetylation is started in the presence of little sulphuric acid as a catalyser preferably at room temperature and employment of a small amount of solvent, for example, acetic acid, and is then continued at similar temperature in the presence of bisulphate. After introducing about 30 to 40% acetic acid into the cellulose molecule in such manner, acetylation is finished at high temperature with the addition of acid or other compound which releases sulphuric acid from the bisulphate.

Partial saponification and stabilization of the cellulose acetate, which takes place, for example, by the addition of water in the form of diluted acetic acid, is carried out according to the present invention in the presence of salts which form with the free sulphuric acid present in the reaction mixture sulphates which are not easily dissolved in concentrated acetic acid but are readily soluble in water or diluted acetic acid. The said salts may also be added entirely or partly during the esterification or in between the end of the acetylation and the beginning of the saponification.

Due to the stagewise acetylation of the cellulose, at first in the presence of a small amount of sulphuric acid, then in the presence of bisulphate, it is possible not only to closely control the reaction but also to distribute the catalyser so uniformly throughout the cellulose that the acetylation from which triacetate results takes places homogenously in all parts of the reaction mixture and a completely homogenous product is obtained, although small amounts of solvent, for example, acetic acid are used.

Since, due to the addition of the salts which produce sulphates not readily soluble in concentrated acetic acid but readily dissolved in water or in diluted acetic acid, the undesired sulphates are destroyed, valuable highly viscous solutions of a very valuable cellulose acetate are obtained which acetate is exceedingly stable and heat resisting. The cellulose acetate solutions according to the present invention can be readily spun; it is also possible, however, to separate the cellulose acetate in known manner and to then use it as plastic material or dissolved in suitable solutions for making films, artificial threads and the like.

Example I

To 100 parts cellulose 150 parts concentrated acetic acid, 0.5 part concentrated sulphuric acid and 100 parts acetic acid anhydride are added, preferably at room temperature whereby esterification is started. In the second stage of the process acetylation is continued at 77° F. to 86° F. with the addition of 10 to 15 parts of a bisulphate, for example, sodium bisulphate which is dissolved or suspended in approximately 180 parts of acetic acid anhydride. As soon as approximately 30 to 40% acetic acid is introduced into the cellulose molecule and after so much of an inorganic acid is added, for example, nitric acid which is preferably dissolved in 50 to 70 parts of glacial acetic acid, that the sulphuric acid bound to the bisulphate is liberated, acetylation is completed in the third stage of our process at a temperature of appproximately 104° F.

The partial saponification and stabilization of the cellulose acetate is effected at a temperature of approximately 104° F. to 122° F. with the customary amount of water in the form of aqueous acetic acid containing a salt, for example, magnesium acetate, which with sulphuric acid forms a sulphate which is slowly soluble in acetic acid but which is readily soluble in water and diluted acetic acid. There is approximately so much salt added that the reaction mixture, after esterification, contains about 50 to 80% of the residual mineral acid as free acid. The solution may be further treated in the manner previously specified.

*Example II*

150 parts of concentrated acetic acid, 0.5 part concentrated sulphuric acid and 100 parts of acetic acid anhydride are added to 100 parts of cotton-linters. Further acetylation takes place at a temperature of from 77 to 86° F. after the addition of 12 parts of ammonium bisulphate which is dissolved or suspended in 170 parts of acetic acid anhydride. The reaction is then completed after addition of as much phosphoric acid as is required for liberating the sulphuric acid bound to the ammonium bisulphate. Partial saponification and stabalization takes place according to the process set forth in Example I.

*Example III*

The acetylation of 100 parts cellulose is started by treatment with 150 parts of concentrated acetic acid, 0.5 part of concentrated sulphuric acid and 100 parts of acetic acid anhydride at approximately room temperature. Thereafter, in the second stage of the process, 16.2 parts of zinc bisulphate are added which is dissolved or suspended in 170 parts of acetic acid anhydride, and acetylation is continued at a temperature of from 68 to 86° F. Esterification is completed in the third stage of the process after the addition of 8 parts of acetyl chloride and 50 parts of concentrated acetic acid. The excessive anhydride is destroyed by means of water in the form of aqueous acetic acid containing about 2 to 5 parts of sodium acetate. A part of the zinc bisulphate thereby forms zinc sulphate which is soluble in water or in diluted acetic acid and which is slowly soluble in concentrated acetic acid. Partial saponification and stabilization of the cellulose acetate is thereafter accomplished at a temperature of 104° F. to 122° F. by adding more water.

*Example IV*

100 parts of cellulose are treated with 150 parts of concentrated acetic acid and 0.5 part of concentrated sulphuric acid and 100 parts of acetic acid anhydride. After acetylation is started, 15 parts of magnesium bisulphate are added which is dissolved or suspended in 200 parts of acetic acid, and acetylation is continued at a temperature of from 77° F. to 86° F. until the cellulose acetate contains about 30 to 40% bound acetic acid. For liberation of the sulphuric acid which is bound to the magnesium bisulphate 5 parts of gaseous hydrogen chloride are introduced into the reaction mixture and acetylation is completed at high temperature, for example, 104° F. Thereafter the excessive acetic acid anhydride is destroyed by means of water in the form of diluted acetic acid; there are also added, if necessary dissolved in said acetic acid, 3 to 5 parts of sodium acetate. The partial saponification takes place by the addition of the customary amounts of water at a temperature of 113° F. to 122° F. In order to completely neutralize the still present free mineral acid 2 parts of sodium carbonate are added before a possible further treatment or precipitation.

While we believe the above described embodiments of our invention to be preferred embodiments, we wish it to be understood that we do not desire to be limited to the exact details of the method shown and described, for obvious modifications will occur to a person skilled in the art.

In using the expression "cellulose" in the claims, it is not intended to restrict the invention to chemically pure cellulose, the exact composition of which is not known, the invention being applicable to materials referred to commercially as cellulose or its derivatives and recognized as being adapted for the production of cellulose acetate by the methods indicated in the specification as set forth in the claims.

We claim:

1. Method of producing concentrated solutions of cellulose acetate, which comprises treating cellulose with concentrated acetic acid and acetic anhydride in the presence of a catalyst in successive stages, and increasing the total quantity of catalyst during such treatment by the addition of a bisulphate followed by the introduction of a compound which releases sulphuric acid from said bisulphate.

2. Method of producing concentrated solutions of cellulose acetate, which comprises treating cellulose with concentrated acetic acid and acetic anhydride in the presence of a small quantity of sulphuric acid as a catalyst, thereafter introducing into the reaction mixture a bisulphate, later adding to the reaction mixture containing the bisulphate a compound which releases sulphuric acid from said bisulphate, and completing the esterification in the presence of the increased quantity of sulphuric acid catalyst.

3. Method of producing concentrated solutions of cellulose acetate, which comprises treating cellulose with concentrated acetic acid and acetic anhydride in the presence of a small quantity of sulphuric acid as a catalyst at approximately room temperature, thereafter introducing into the reaction mixture a bisulphate and raising the temperature to between 77° F. and 86° F., later adding to the reaction mixture containing the bisulphate a compound which releases sulphuric acid from said bisulphate, and completing the esterification in the presence of the increased quantity of sulphuric acid catalyst at a temperature in the neighborhood of 104° F.

4. Method of producing concentrated solutions of cellulose acetate, which comprises treating cellulose with concentrated acetic acid and acetic anhydride in the presence of a small quantity of sulphuric acid as a catalyst, thereafter introducing into the reaction mixture a bisulphate selected from the group consisting of the bisulphates of sodium, ammonium, zinc and magnesium, later adding to the reaction mixture containing the bisulphate a compound selected from the group consisting of nitric acid, phosphoric acid, acetyl chloride and gaseous hydrogen chloride which releases sulphuric acid from said bisulphate, and completing the esterification in the presence of the increased quantity of sulphuric acid catalyst.

5. Method of producing concentrated solutions of stable, highly viscous, partially saponified cellulose acetate, which comprises treating cellulose with concentrated acetic acid and acetic anhydride in the presence of a catalyst in successive stages, increasing the total quantity of catalyst during such treatment by the addition of a bisulphate followed by the introduction of a compound which releases sulphuric acid from said bisulphate, and stabilizing and partially saponifying the cellulose acetate by the addition of a hydrous solution of a salt which forms with the sulphuric acid remaining in the reaction mixture a sulphate which is difficultly soluble in concentrated acetic acid but readily soluble in water or hydrous acetic acid.

6. Method of producing concentrated solutions of stable, highly viscous, partially saponified cellulose acetate, which comprises treating cellulose with concentrated acetic acid and acetic anhydride in the presence of a small quantity of sulphuric acid as a catalyst, thereafter introducing into the reaction mixture a bisulphate, later adding to the reaction mixture containing the bisulphate a compound which releases sulphuric acid from said bisulphate, completing the esterification in the presence of the increased quantity of sulphuric acid catalyst, and stabilizing and partially saponifying the cellulose acetate by the addition of a hydrous solution of a salt which forms with the sulphuric acid remaining in the reaction mixture a sulphate which is difficultly soluble in concentrated acetic acid but readily soluble in water or hydrous acetic acid.

7. Method of producing concentrated solutions of stable, highly viscous, partially saponified cellulose acetate, which comprises treating cellulose with concentrated acetic acid and acetic anhydride in the presence of a small quantity of sulphuric acid as a catalyst, at approximately room temperature, thereafter introducing into the reaction mixture a bisulphate and raising the temperature to between 77° F. and 86° F., later adding to the reaction mixture containing the bisulphate a compound which releases sulphuric acid from said bisulphate, completing the esterification in the presence of the increased quantity of sulphuric acid catalyst at a temperature in the neighborhood of 104° F., and stabilizing and partially saponifying the cellulose acetate by the addition of a hydrous solution of a salt which forms with the sulphuric acid remaining in the reaction mixture a sulphate which is difficultly soluble in concentrated acetic acid but readily soluble in water or hydrous acetic acid.

8. Method of producing concentrated solutions of stable, highly viscous, partially saponified cellulose acetate, which comprises treating cellulose with concentrated acetic acid and acetic anhydride in the presence of a small quantity of sulphuric acid as a catalyst, thereafter introducing into the reaction mixture a bisulphate selected from the group consisting of the bisulphates of sodium, ammonium, zinc and magnesium, later adding to the reaction mixture containing the bisulphate a compound selected from the group consisting of nitric acid, phosphoric acid, acetyl chloride and gaseous hydrogen chloride which releases sulphuric acid from said bisulphate, completing the esterification in the presence of the increased quantity of sulphuric acid catalyst, and stabilizing and partially saponifying the cellulose acetate by the addition of a hydrous solution of a salt which forms with the sulphuric acid remaining in the reaction mixture a sulphate which is difficultly soluble in concentrated acetic acid but readily soluble in water or hydrous acetic acid.

9. Method of producing concentrated solutions of stable, highly viscous, partially saponified cellulose acetate, which comprises treating cellulose with concentrated acetic acid and acetic anhydride in the presence of a catalyst in successive stages, increasing the total quantity of catalyst during such treatment by the addition of a bisulphate followed by the introduction of a compound which releases sulphuric acid from said bisulphate and stabilizing and partly saponifying the cellulose acetate by introduction of aqueous acetic acid containing a salt which forms with the sulphuric acid remaining in the reaction mixture a sulphate which is difficultly soluble in concentrated acetic acid but readily soluble in water or hydrous acetic acid.

10. Method of producing concentrated solutions of stable, highly viscous, partially saponified cellulose acetate, which comprises treating cellulose with concentrated acetic acid and acetic anhydride in the presence of a small quantity of sulphuric acid as a catalyst, thereafter introducing into the reaction mixture a bisulphate, later adding to the reaction mixture containing the bisulphate a compound which releases sulphuric acid from said bisulphate, completing the esterification in the presence of the increased quantity of sulphuric acid catalyst, and stabilizing and partly saponifying the cellulose acetate by introduction of aqueous acetic acid containing a salt which forms with the sulphuric acid remaining in the reaction mixture a sulphate which is difficultly soluble in concentrated acetic acid but readily soluble in water or hydrous acetic acid.

11. Method of producing concentrated solutions of stable, highly viscous, partially saponified cellulose acetate, which comprises treating cellulose with concentrated acetic acid and acetic anhydride in the presence of a small quantity of sulphuric acid as a catalyst at approximately room temperature, thereafter introducing into the reaction mixture a bisulphate and raising the temperature to between 77° F. and 86° F., later adding to the reaction mixture containing the bisulphate a compound which releases sulphuric acid from said bisulphate, completing the esterification in the presence of the increased quantity of sulphuric acid catalyst at a temperature in the neighborhood of 104° F., and stabilizing and partly saponifying the cellulose acetate by introduction of aqueous acetic acid containing a salt which forms with the sulphuric acid remaining in the reaction mixture a sulphate which is difficultly soluble in concentrated acetic acid but readily soluble in water or hydrous acetic acid.

12. Method of producing concentrated solutions of stable, highly viscous, partially saponified cellulose acetate, which comprises treating cellulose with concentrated acetic acid and acetic anhydride in the presence of a small quantity of sulphuric acid as a catalyst, thereafter introducing into the reaction mixture a bisulphate selected from the group consisting of the bisulphates of sodium, ammonium, zinc and magnesium, later adding to the reaction mixture containing the bisulphate a compound selected from the group consisting of nitric acid, phosphoric acid, acetyl chloride and gaseous hydrogen chloride which releases sulphuric acid from said bisulphate, completing the esterification in the presence of the increased quantity of sulphuric acid catalyst, and stabilizing and partly saponifying the cellulose acetate by introduction of aqueous acetic acid containing a salt which forms with the sulphuric acid remaining in the reaction mixture a sulphate which is difficultly soluble in concentrated acetic acid but readily soluble in water or hydrous acetic acid.

13. The herein described highly viscous, stable and heat-resisting cellulose acetate product obtained by treating cellulose with concentrated acetic acid and acetic anhydride in the presence of a catalyst in successive stages, increasing the total quantity of catalyst during such treatment by the addition of a bisulphate followed by the introduction of a compound which releases sulphuric acid from said bisulphate, and stabilizing and partly saponifying the cellulose acetate by the addition of a hydrous solution of a salt which forms with the sulphuric acid remaining in the reaction mixture a sulphate which is difficultly soluble in concentrated acetic acid but readily soluble in water or hydrous acetic acid.

14. Method of producing concentrated solutions of stable, highly viscous, partially saponified cellulose acetate, which comprises treating cellulose with concentrated acetic acid and acetic anhydride in the presence of a catalyst in successive stages, increasing the quantity of catalyst during such treatment by setting free in the reaction mixture sulphuric acid from a bisulphate of a base whose sulphate is capable of stabilizing the resulting cellulose acetate, effecting the stabilization with the resulting sulphate, and partially saponifying the cellulose acetate.

WOLFGANG GRUBER.
MATTHIAS THOMA.
HUGO ZOEBELEIN.